Feb. 7, 1967 T. A. PENDLETON 3,303,425
BINARY DETECTION SYSTEM
Filed April 9, 1963
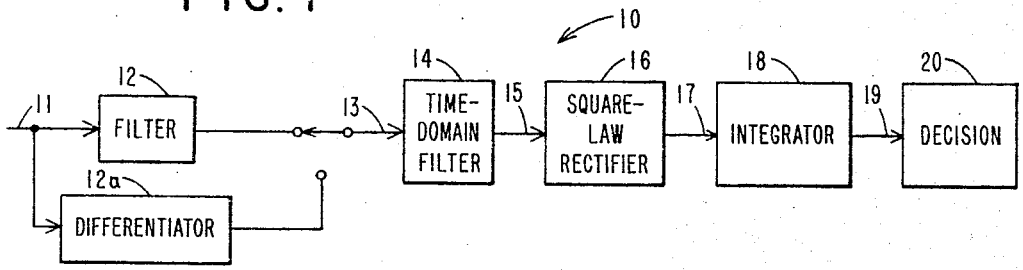
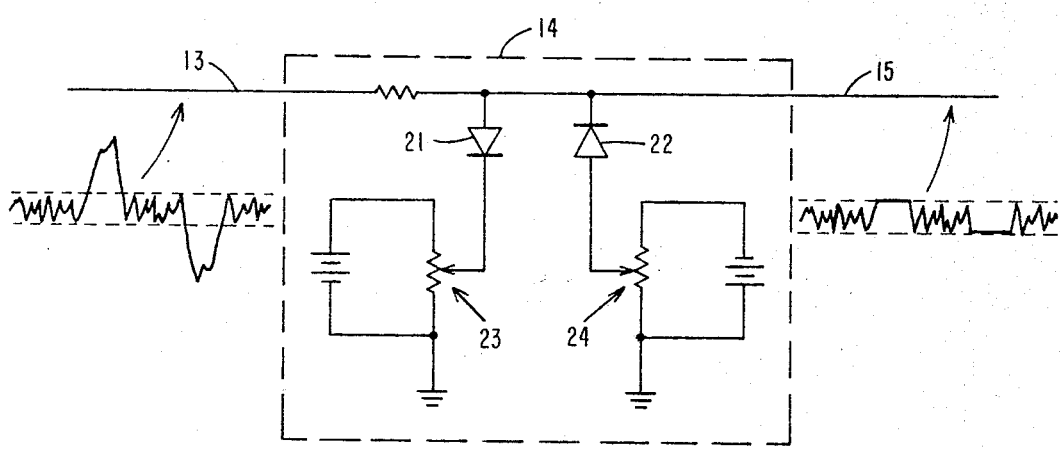
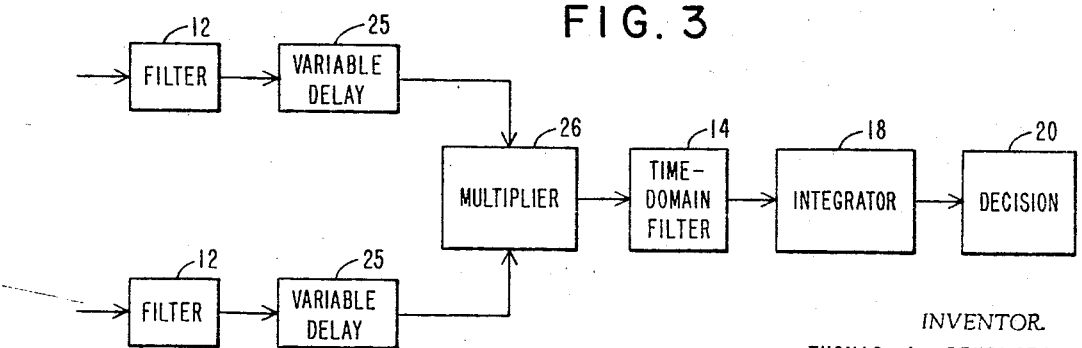
INVENTOR.
THOMAS A. PENDLETON
BY
Martha L. Ross
AGENT United States Patent Office 3,303,425
Patented Feb. 7, 1967

3,303,425
BINARY DETECTION SYSTEM
Thomas A. Pendleton, Adelphi, Md., assignor to Atlantic Research Corporation, a corporation of Virginia
Filed Apr. 9, 1963, Ser. No. 271,753
7 Claims. (Cl. 328—165)

This invention relates to an improved binary detection system for detecting the presence of a weak signal in noise. More specifically, it relates to a system for enhancing the detection of these signals by reducing the degradation of detectability caused by intermittent or pulse noise.

A binary detector is essentially an energy-measuring device which discriminates between the two states of signal and noise, and noise alone, on the basis of the difference in energy which these two states represent. The signal being detected is a random or noise-like function, as distinguished from a deterministic function. This random signal may be indistinguishable from its Gaussian noise background and is often referred to as a Gaussian signal. When detection of these type signals is to be made in the presence of Gaussian noise, binary detector structures are readily available in the art. See, for example, Middleton: "Introduction to Statistical Communication Theory," McGraw-Hill, 1960, Chapters 19 and 20. Middleton discloses a system for determining whether or not a noise-like signal, having an unknown waveform, is present in a Gaussian noise background. His system comprises filtering, square-law rectification or detection, integration and indication. If the power spectra of the signal and noise are known then the input wave filter is chosen to maximize the signal-to-noise ratio, e.g., low-pass, band-pass, etc.

In addition to Gaussian noise, the background of these Gaussian signals may include intermittent or pulse noise which is non-Gaussian in waveform. The problem, of course, in a binary detector is one of threshold, or weak-signal, detection in which the intensity of the accompanying noise is comparable to that of the signal when present. When non-Gaussian noise is added, the noise intensity frequently exceeds that of the signal. If the signal is equal to or above the minimum detectable threshold, the integrator output will recognize its energy contribution by an increase in its output within a comparatively short time and thus give a positive indication of the presence of a signal. If the signal is weak the change in energy level is so slight that detection cannot be ascertained unless the integration time approaches an impractical limit. It is known, however, that binary detectors are often subject to "false alarms" or, better stated, erroneous indications of the presence of a signal. Since these detectors are energy-measuring systems, it is apparent that in the absence of a signal the false alarm must be due to an increase in the energy level of the noise, usually caused by intermittent non-Gaussian components. With this increase in background noise a higher threshold is now required for signal detectability and, accordingly, the energy level of an incoming signal must be greater, than previously required, to attain this higher threshold level. With this increase of threshold the sensitivity of the detector is reduced because those signals above the previous threshold but below the increased threshold are lost since they are no longer discernible.

By investigation I have found that these lost signals can sometimes be detected by studying the characteristics of the noise reaching the integrator. Noise can occur in the detector which is intermittent with time and which therefore differs from the normal Gaussian noise background. This intermittent or pulse noise is a form of non-Gaussian noise and when a burst or pulse of this noise reaches the integrator, additional fluctuations will occur in the integrator output which will give a false alarm as described above. However, by understanding the cause of this false alarm, I can now regain those lost signals by minimizing or eliminating the effect of this pulse noise on the integrator. In this manner a new threshold will not be required in the system and the degradation of detectability is reduced.

Accordingly, an object of the present invention is to provide a binary detector having improved apparatus for discriminating between the two states of signal and noise and noise alone.

A second object is to provide an improved binary detector which minimizes or eliminates the effect of pulse noise and thereby reduces the degradation of detectability caused by this noise.

Other objects and advantages of this invention will become apparent by a reading of the following description in conjunction with the drawings wherein:

FIGURE 1 is a block diagram of a detector system embodying my invention;

FIGURE 2 is a schematic diagram of a limiter circuit which may be used in my detector systems in accordance with my invention, showing representative wave forms at selected points; and FIGURE 3 is a block diagram of a multi-channel detector system embodying my invention.

In FIGURE 1 there is shown a binary detector, indicated generally by the reference character 10, assembled according to my invention and composed entirely of conventional electronic circuitry. The input on line 11 to the detector will arrive as an unknown waveform composed of a signal, Gaussian noise and possibly pulse noise or components convertible to pulse noise within the detector system. This waveform is the type which often is presented to passive detecting equipment and which has to be analyzed to determine whether or not a signal is present. Due to the similarity of terminology, binary or "yes-no" detection is often times confused with better-known forms of detection, such as that performed in conventional radio receivers, when actually the two types of detection are generally unrelated. In detectors found in radio receivers, for example, the input generally has known characteristics and the signal is readily extracted. No extraction of a signal is attempted with my equipment since it is noise-like in appearance and relatively weak, and therefore, indistinguishable from the noise itself. Therefore, for my purpose I have to be content with merely determining whether or not any signal is present at all in the noise background.

The signal is fed to a filter 12 and the output of the filter is applied through lead 13 to the time-domain filter 14. The effect of the time-domain filter 14 is to reduce or eliminate the pulse or intermittent noise which may be present in the detector system, as later described. The output of the time-domain filter 14 is next applied through lead 15 to a conventional square-law rectifier or detector 16 and then through lead 17 to be integrated in integrator 18 and fed through lead 19 to a decision device 20 such as a conventional indicator, scope or threshold circuit, preferably having an adjustable threshold control.

FIGURE 2 shows a schematic of one form of a time-domain filter 14 which can be employed in my invention. Two diodes 21, 22, and their respective variable bias 23, 24 form a conventional amplitude gate which passes only those portions of the input signal lying between the two amplitude boundaries as determined by the bias voltages. A representative waveform of Gaussian signal and noise which contains the addition of intermittent large amplitude bursts of pulse noise is shown on lead 13 at the input to the limiter 14. The dotted lines represent the amplitude boundaries as determined by the bias voltages which are adjusted to pass to the output line 15 the positive and negative peaks of Gaussian signal and noise. Any amplitudes in the waveform which exceed these peaks such as those caused by the addition of pulse noise are clipped by this circuit and a waveform such as the one shown at lead 15 is passed to the remainder of the system. This technique is termed by me "time-domain filtering" where reduced weight is given to those time intervals of low signal-to-noise ratio. This type of filtering can be better understood by comparing it with normal frequency filtering where frequencies having low signal-to-noise ratios are rejected. In my case it is not frequencies themselves but domains of time having low signal-to-noise ratios which are rejected. It is readily seen that such a time domain can occur during the presence of a large amplitude pulse which is predominantly noise. Accordingly, I reduce or eliminate the energy of this pulse during those times that it occurs in my detector.

FIGURE 3 discloses in block diagram form a multichannel binary detector in which the invention is employed, the detector here being a conventional crosscorrelator. The input to the filters 12 will be of the same character as discussed in FIGURE 1, except that the waveform at each input will differ. Nevertheless, any signal present in the waveforms will be the same at each input, except for the possibility of a time delay, while the noise components in the waveform will be uncorrelated. The output of the filters 12 are fed to variable time-delay means 25 which can be varied to put the signals in coincidence when necessary. The waveforms from each channel are next multiplied in multiplier 26 and subsequently fed to integrator 18 and indicating means 20. In this embodiment the time-domain filter 14 is shown positioned just prior to the integrator to eliminate any pulse noise which might be present in the product of the waveforms.

The amplitude gate is but one form of a time-domain filter which can be employed in my invention. The amplitude gate minimizes the effect of pulse noise on my detector but does not eliminate its completely. This is seen by referring to the output waveform on line 15 in FIGURE 2 which shows that the pulse noise has been clipped but still contains energy in the unclipped portion. This energy will of course pass to the integrator but since its level is substantially the same as that of the Gaussian signal and noise, its effect on the integrator will be greatly reduced. Therefore, the result of this limiter will be first of all to reduce the false alarms attributable to pulse noise and secondly, since the integrator output has not been appreciably changed, to prevent the level of threshold detectability from being increased so that a subsequent signal will not be lost. It is also possible to employ other types of time-domain filters. One alternative would be to use an electronic switch having a variable bias control such as described for the limiter so that when the set limit was exceeded by the amplitude of the noise pulse the switch would operate to stop the integration or inhibit the input to the integrator until such time as the amplitude of the noise pulse once again fell below this limit. This last type of time-domain filtering would eliminate rather than just minimize the effect of the large amplitude pulse noise on the system.

When I employ time-domain filtering techniques by the use of a limiter or other means as described above, I have found that the criterion for the choice of an input filter 12 is, in general, different. Usually, a wave filter is used in binary detectors which maximizes the signal-to-noise ratio as mentioned earlier. But since we are now concerned with the signal-to-Gaussian-noise ratio, by the elimination or minimization of the non-Gaussian noise, we must choose a filter which will put the non-Gaussian noise in the optimum form of our purposes. If the non-Gaussian noise present at the input to the filter 12 has energy in the band of this filter, then it is desirable to choose this filter such that its response to the non-Gaussian noise is pulse noise. If we choose a filter which passes the non-Gaussian noise energy but does not put this noise in pulse form, then the time-domain filter 14 is unable to operate on this noise and it will pass to the integrator 18. Therefore, the criterion for the choice of a filter 12 includes consideration of both the signal-to-Gaussian-noise ratio and the ability of a chosen filter to present in pulse form at its output whatever non-Gaussian noise passes therethrough. Of course, it is not expected that an ideal or perfect filter can be found for every input waveform, but one skilled in the art, in view of my teachings and by a knowledge of the statistics of the input waveform, can fiind the most suitable filter. To increase the versatility of the detector, different input filters can be provided, with switching utilized to select the particular filter in operation at a given time, as depicted in FIGURE 1. If, for example, the detector input includes non-Gaussian noise in the form of a random square wave noise component, along with a Gaussian signal and Gaussian noise, then I have found that a differentiator 12a used as an input filter, as shown in FIGURE 1, can improve detection. The output of the differentiator 12a will contain Gaussian signal, Gaussian noise and a series of high peaks or impulses due to the differentiation of the square-wave noise, and this output will be fed to the time-domain filter 14 for processing, as before. The particular filter switched into the system for a given application will depend upon the form of the non-Gaussian noise which is expected, and of course if the system is to be utilized for an application in which only one form of non-Gaussian noise is expected, then only one filter need be provided and switching will not be required.

It has been shown that my invention improves the present state of binary detectors by eliminating or minimizing the effect of non-Gaussian pulse noise occurring in a binary detection system before this noise reaches the energy-measurement device. Thus it is mandatory that the time-domain filter 14 be physically located in the detector between the input filter 12 (or waveform converter, e.g. differentiator 12a) and the integrator 18. It is obvious from this statement and from my disclosure that the time-domain filter 14 can be relocated in the detector system. In FIGURE 1, for example, the time-domain filter can be positioned after the square-law detector 16; or in FIGURE 3, a time-domain filter 14 can be positioned in each channel after the filter 12 to eliminate or minimize the pulse noise prior to the multiplication step.

While the invention has been described with respect to exemplary embodiments, it is evident that various modifications and changes would be obvious to one skilled in the art. Thus it is not intended to limit the spirit and scope of the invention except as defined by the appended claims.

I claim:

1. Apparatus for the binary detection of the presence of signals in an input waveform containing Gaussian and non-Gaussian noise components comprising filter means for receiving said input waveform and passing to the remainder of the detection apparatus a transformed waveform in which the non-Gaussian components are distinguishable in amplitude from the signal and Gaussian components, adjustable means for reducing to at least a preset level those amplitudes which exceed the preset level, the excessive amplitudes being caused primarily by the non-Gaussian components, means responsive to the output of said adjustable means for measuring the remaining energy in said filtered waveform and means responsive to the output of said energy measuring means for indicating the presence of a signal.

2. Apparatus for the binary detection of the presence of signals in input waveforms containing Gaussian and non-Gaussian noise components comprising first and second channels, each channel having filter means for receiving an input waveform and passing to the remainder of its channel a filtered waveform in which the non-Gaussian components are distinguishable in amplitude from the signals and Gaussian components, adjustable delay means in at least one of said channels for bringing the signals in said first and second channels into coincidence, means for multiplying together the output of each channel, means responsive to the output of said multiplying means for measuring the energy of the multiplied channel outputs, means responsive to the output of said energy measuring means for indicating the presence of a signal and adjustable means positioned in said detection apparatus between the output of said filters and the energy measuring apparatus for reducing the amplitudes created by the non-Gaussian components which exceed a pre-set amplitude level.

3. Apparatus as claimed in claim 2 wherein said preset amplitude level is controlled by said adjustable means and is set at a level greater than substantially all of the amplitudes of the signals and Gaussian components.

4. Apparatus for the binary detection of the presence of signals in an input waveform containing Gaussian and non-Gaussian noise components comprising means for transforming non-Gaussian noise components into other components distinguishable in amplitude from the signal and Gaussian noise components, means connected to said transforming means for reducing to a preset level the energy of said other components which exceed the preset level, and means connected to said reducing means for measuring the energy of the resultant waveform.

5. Apparatus for the binary detection of the presence of signals in an input waveform containing Gaussian and non-Gaussian noise components comprising a filter circuit means for receiving said input waveform and transforming non-Gaussian noise components into other components distinguishable in amplitude from the signal and Gaussian noise components, a clipping circuit connected to said filter circuit and adapted to reduce to a preset level the energy of said other components which exceed the preset level, and measuring means connected to said clipping circuit to measure the energy of the resultant waveform.

6. Apparatus for the binary detection of the presence of signals in an input waveform containing Gaussian and non-Gaussian noise components comprising a filter having an input and an output, said filter input adapted to receive said input waveform and to transform non-Gaussian noise components into other components distinguishable in amplitude from the signal and Gaussian noise components, first and second variable biasing means, first and second voltage limiting means, each of said voltage limiting means having first and second terminals, each of said first terminals connected to said filter output, the second terminal of said first voltage limiting means connected to said first biasing means, the second terminal of said second voltage limiting means connected to said second biasing means, and voltage measuring means connected to said voltage limiting means and adapted to measure the voltage received therefrom.

7. The apparatus claimed in claim 6 wherein said filter is a differentiator circuit.

References Cited by the Examiner
UNITED STATES PATENTS

| | | | |
|---|---|---|---|
| 2,525,634 | 10/1950 | Atwood et al. | 328—165 X |
| 2,956,153 | 10/1960 | Farlow | 328—167 X |
| 3,164,775 | 1/1965 | Morgan. | |
| 3,188,554 | 6/1965 | Reid | 307—88.5 X |
| 3,204,119 | 8/1965 | Gray | 307—88.5 |

ARTHUR GAUSS, *Primary Examiner.*

J. JORDAN, *Assistant Examiner.*